United States Patent [19]

Jordan

[11] 4,322,869
[45] Apr. 6, 1982

[54] WHEEL ASSEMBLY

[76] Inventor: Gerald J. Jordan, P.O. Box 93, Marceline, Mo. 64658

[21] Appl. No.: 185,108

[22] Filed: Sep. 8, 1980

[51] Int. Cl.³ .............................................. A47B 91/00
[52] U.S. Cl. ...................................................... 16/46
[58] Field of Search ................ 16/45, 46, 47, 48, 18 R

[56] References Cited

U.S. PATENT DOCUMENTS

| | | |
|---|---|---|
| 320,366 | 6/1885 | Kratzer . |
| 320,554 | 7/1885 | Harmon . |
| 481,963 | 3/1892 | Minor . |
| 484,054 | 3/1892 | Sharpneck . |
| 494,767 | 1/1893 | Wagner . |
| 575,245 | 1/1897 | Judkins ................................. 16/46 |
| 945,981 | 1/1910 | Peet ........................................ 16/46 |
| 1,474,600 | 6/1923 | McNutt . |
| 1,780,761 | 11/1930 | Naschke, Jr. . |
| 1,784,910 | 12/1930 | Rowntree . |
| 2,291,600 | 8/1942 | Atkinson ............................. 301/5.7 |
| 2,437,907 | 3/1948 | Casper ................................... 16/46 |
| 3,806,213 | 4/1974 | Nagai .................................. 308/207 |
| 3,895,844 | 7/1975 | Merbler .............................. 301/5.7 |
| 4,054,335 | 10/1977 | Timmer ............................... 308/191 |

Primary Examiner—Doris L. Troutman
Attorney, Agent, or Firm—Blanchard, Flynn, Thiel, Boutell & Tanis

[57] ABSTRACT

A freely rotatable wheel assembly including a one-piece freely-rotatable annular rim having a central opening therethrough. The rim is of a hard low-friction material and has an inner surface which surrounds the opening for defining an outer bearing race. A bearing positioned within the central opening creates a low-friction rolling engagement between the rim and a shaft which is coaxially positionable in the opening. The bearing includes cylindrical rollers constructed of hard low-friction nonmetallic material. The rollers are uniformly angularly spaced around the rotational axis so that the roller axes define a circular locus about the rotational axis. The rollers are individually disposed in direct rolling engagement with the outer bearing race and with an inner bearing race defined by the shaft. A pair of annular retainers are disposed concentrically with the central opening adjacent the opposite ends thereof so that the rollers are disposed axially therebetween. The retainers are freely rotatable relative to both the rim and the shaft. An axle extends parallel to the rotational axis and has the opposite ends thereof freely rotatably supported on the retainers. Each axle has a respective roller freely rotatably supported thereon.

15 Claims, 10 Drawing Figures

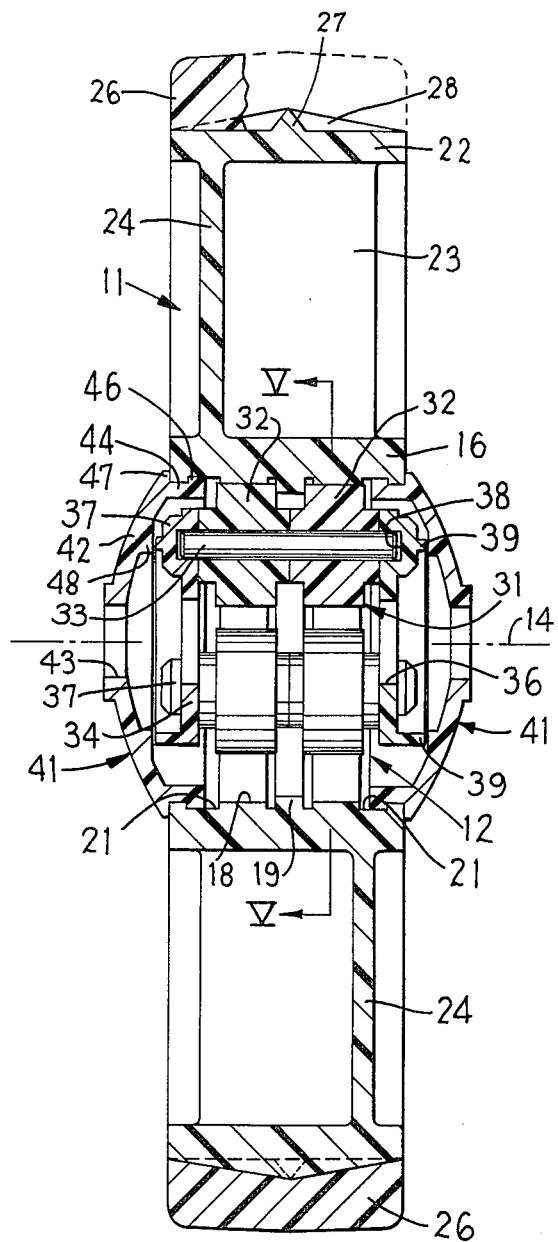
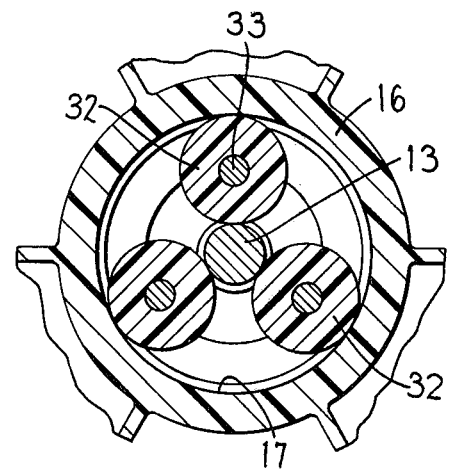
FIG. 4
FIG. 5

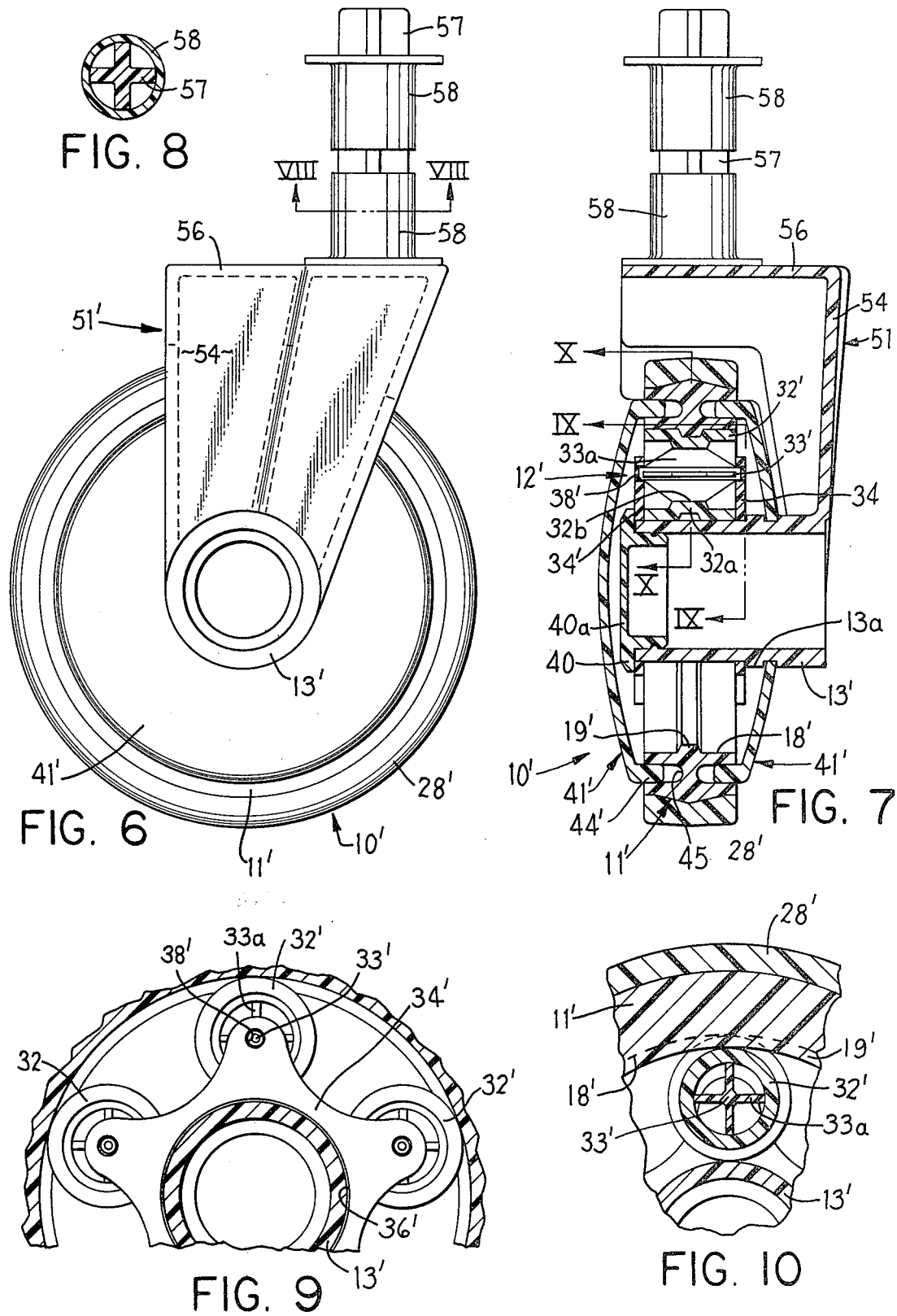

WHEEL ASSEMBLY

FIELD OF THE INVENTION

This invention relates to an improved wheel assembly which provides for improved rotation of the wheel assembly relative to a nonrotatable support axle such that minimal friction, and hence minimal driving energy, is involved.

BACKGROUND OF THE INVENTION

Numerous wheel assemblies have been devised employing various types of anti-friction rolling elements, including planetary systems, for permitting the wheel to be rotatably supported on or relative to an axle. While such wheel assemblies have normally performed in a manner which has been considered satisfactory, nevertheless there has been a long term and continuous effort to improve on such wheel assemblies so as to make them more free-wheeling, as by minimizing the internal friction of the wheel assembly, while at the same time maintaining or improving the durability of the wheel assembly. This problem of providing a wheel assembly which is substantially free-wheeling, that is possesses minimum friction, and at the same time possesses desirable wear and durability characteristics, has been further compounded by the additional difficulties created due to use of many wheels under contaminating environmental conditions (such as snow, water, liquids, dust and the like) which tend to contaminate the bearings, thereby greatly increasing both wear and rolling friction.

Thus, it is an object of the present invention to overcome many of the disadvantages associated with known wheel assemblies by providing an improved wheel assembly which results in a significant improvement in the rotational characteristics thereof by minimizing the rolling friction within the wheel assembly, while at the same time resulting in a wheel assembly having desirable durability. These desirable objectives are achieved in the improved wheel assembly of this invention by providing a wheel assembly having an increased number of rotational freedoms between the various parts of the wheel assembly, whereby the wheel more closely approaches a freely rotating system, thereby greatly minimizing the driving energy required to effect such rotation.

In the improved wheel assembly of this invention, the wheel includes an annular rim having the outer bearing race formed directly on the inner periphery thereof. A minimal number of substantially cylindrical rollers are positioned within the rim so as to be in rolling engagement with the aforesaid outer bearing race, which rollers in turn are normally rollingly engaged with an inner bearing race formed directly on the center support axle. The cylindrical rollers are themselves individually rotatably supported on suitable axles, which axles in turn are rotatably supported on and extend between a pair of retainer rings. The retainer rings themselves are freely rotatable relative to both the rim and the support shaft. Suitable end caps are fixed to the rim and closely confine the retainers and cylindrical rollers so as to sealingly enclose same. In a preferred embodiment, the end caps also retain the cylindrical rollers and retainers in an assembled condition with the rim irrespective of the presence of the support shaft.

Other objects and purposes of the invention will be apparent to persons familiar with wheel assemblies upon reading the following specification and inspecting the accompanying drawings.

BRIEF DESCRIPTION OF THE DRAWINGS

FIG. 4 is a central sectional view, on an enlarged scale, of this improved wheel assembly.

FIG. 5 is a fragmentary sectional view taken substantially along line V-V in FIG. 4.

FIG. 6 is a view similar to FIG. 1 but illustrating a variation of the invention.

FIG. 7 is a central sectional view of the wheel assembly shown in FIG. 6.

FIG. 8 is a sectional view taken along line VIII—VIII in FIG. 6.

FIG. 9 is a fragmentary, partial sectional view taken substantially along line IX—IX in FIG. 7.

FIG. 10 is a fragmentary sectional view taken substantially along line X—X in FIG. 7.

Figure 1:
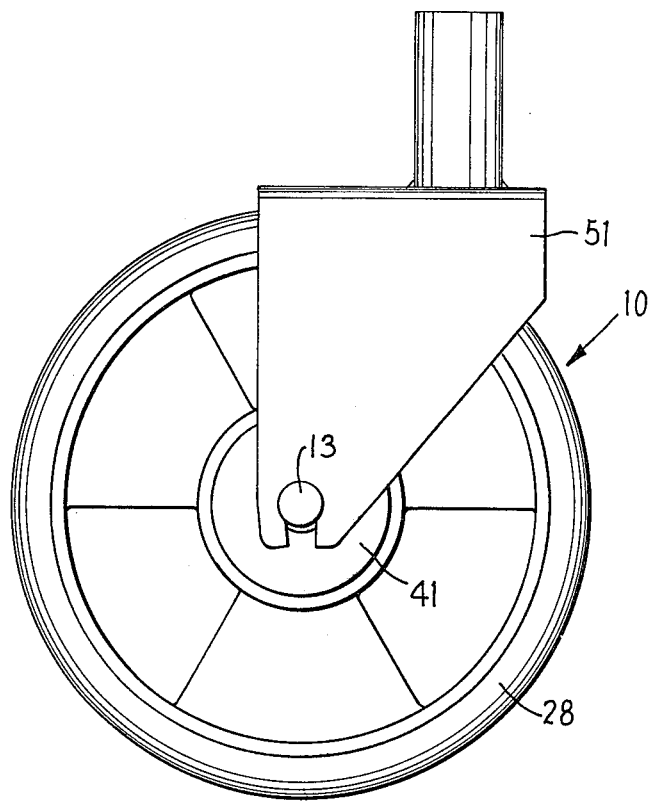
FIG. 1 is a side elevational view of a preferred embodiment of a wheel assembly according to the present invention, which wheel assembly has a standard support yoke associated therewith.

Certain terminology will be used in the following description for convenience in reference only, and will not be limiting. For example, the words "upwardly, "downwardly", "rightwardly" and "leftwardly" will refer to directions in the drawings to which reference is made. The words "inwardly" and "outwardly" will refer to directions toward and away from, respectively, the geometric center of the wheel assembly and designated parts thereof. Said terminology will include the words specifically mentioned, derivatives thereof, and words of similar import.

DETAILED DESCRIPTION

Referring to FIGS 1-5, there is illustrated a preferred embodiment of a wheel assembly 10 according to this invention, which wheel assembly has exhibited extremely low friction and hence possesses substantially free-wheeling characteristics. This wheel assembly 10 includes an annular rim 11 disposed in surrounding relationship to a bearing means 12, the latter in turn being rotatably engageable with a support shaft 13 which defines the rotational axis 14 for the wheel assembly.

The rim 11 includes an inner annular hub 16 which defines therethrough a substantially cylindrical central opening 17. The inner periphery of hub 16 defines a radially inwardly directed bearing surface 18 which, as illustrated in FIG. 4, includes two annular portions of equal diameter separated by an annular rim 19 which projects radially inwardly. These annular surfaces 18 function directly as outer bearing races, as explained hereinafter.

The inner hub 16 also has a pair of undercut annular grooves 21 formed in the inner surface thereof, which grooves are located adjacent the axially outer edge of a respective bearing surface 18.

The rim 11 also includes an outer annular hub or rim portion 22 which is concentric with the inner hub 16 and is rigidly joined thereto by a plurality of spokes 23 which are angularly spaced about the rim and extend radially thereof. These spokes 23 have an axial width which closely approximates the overall axial width of the rim, and the radially adjacent spokes 23 in turn are joined together by walls 24, the latter being alternately located adjacent the opposite sides of the rim so as to cooperate with spokes 23 and thereby form a continuous and nonperforated wall extending radially between the inner and outer hubs 16 and 22, respectively.

The rim 11 is preferably formed as an integral one-piece structure, such as by being molded, and is also preferably formed from a hard low-friction plastic material, such as Delrin (trademark).

In many use applications, the wheel assembly 10 is preferably provided with an annular tire or tread 26 fixed to and externally surrounding the rim. For this purpose, the exterior of the rim portion 22 is preferably provided with a rib 27 which projects radially outwardly thereof and extends circumferentially around the complete periphery thereof, which rib 27 is substantially centrally located. A further plurality of small ribs 28 extend axially from the center rib 27 and project toward the adjacent axial edges of the rim portion 22. These ribs 28 are circumferentially spaced apart at substantially uniform intervals about the periphery of the rim. These ribs 27 and 28, when the tire or tread 26 is molded around the rim, thus provide a bond and mechanical lock to prevent the tread from slipping axially or circumferentially with respect to the rim. In most use applications, it is anticipated that the tread 26 will be molded of a plastics material, such as polyurethane.

Considering now the bearing means 12, same includes a plurality of substantially cylindrical roller units 31 disposed angularly about the rotational axis 14 at uniformly spaced intervals. The illustrated embodiment possesses three such angularly spaced roller units 31, and the illustrated embodiment also discloses each roller unit as employing a pair of identical axially-aligned rollers 32, which rollers 32 are individually disposed for rolling engagement with a respective one of the bearing surfaces 18. The cooperating pair of rollers 32 have the peripheries thereof slightly axially spaced apart so as to accommodate therebetween the annular rib 19, which rib has the side surfaces or shoulders thereof positioned closely adjacent the inner end surfaces of the rollers 32 so as to permit transference of side thrust forces therebetween. While the drawings illustrate the use of an identical pair of individual rollers 32, it will be appreciated that the cooperating pair of rollers could be formed as a single roller if desired.

Each cooperating pair of rollers 32 is rotatably supported on an axle 33, the axis of which extends parallel with but is spaced radially outwardly from the rotational axis 14. Each axle 33 in turn extends axially between and is rotatably supported on a pair of identical annular retainers 34, which retainers 34 are located adjacent the opposite axial ends of the central opening 17.

Each retainer 34 comprises a platelike ring having a central opening 36 so as to accommodate therein the shaft 13. The retainer has a maximum radial dimension which is substantially less than the diameter of the central opening 17 so that the retainer will easily fit within this central opening 17 without rubbing or bearing against the bounding peripheral wall thereof. The retainer has a number of enlargements 37 thereon equal to the number of roller units, there being three such enlargements in the illustrated embodiment. This enlargement 37 has a cuplike configuration in that it defines therein a blind bore or recess 38 which opens only axially inwardly of the retainer and is sized so as to snugly yet freely rotatably support the adjacent end of the axle 33.

The retainer 34 also has an annular flange 39 fixedly and integrally formed therewith, which flange is concentric with the retainer and projects axially outwardly thereof so that the axially outer end of same defines a substantially planar abutment or rubbing surface for a purpose to be explained hereinafter.

The retainer 34 is preferably formed in one piece, as by being molded of a hard low-friction plastic material, such as Delrin. The bearing rollers are also preferably formed from a hard low-friction plastic material, such as Delrin.

The wheel assembly 10 also includes a pair of substantially identical end caps 41 which are fixedly secured, as by a snap fit, to the opposite ends of inner hub 16 so as to effectively close off the opposite ends of the central opening 17.

The end cap 41 is of a substantially cuplike configuration and includes a bottom or base wall 42 which effectively extends across the central opening. This base wall has a central opening 43 so as to snugly but rotatably accommodate the shaft 13. The base wall 42, adjacent its radially outer edge, is joined to an annular flange 44 which projects radially inwardly so as to be snugly accommodated within the adjacent end of the central opening 17. This annular flange 44 has, at its inner free end, a radially outwardly projecting rib or tab 46. The base wall 42 also has an outer rib or edge 47 which projects slightly outwardly beyond the flange 44. The flange 44 is sufficiently elastically deformable as to enable it to be forced into the adjacent end of the central opening 17 so that the rib 46 snaps into the undercut groove 21. At the same time, the outer rib 47 snugly overlies the outer end face of the hub 16. The end cap 41 is thus fixedly secured to and effectively sealingly closes off the rim 11 to prevent contamination of the bearings located within the opening 17.

End cap 41 also has an annular abutment rib or flange 48 associated therewith, which flange projects radially inwardly from the base wall 42 and has a diameter substantially equal to that of the rib 39 on the retainer. This flange 48 terminates in a substantially planar abutment surface which is positioned closely adjacent the opposed abutment surface on the retainer rib. The two end caps 41 thus cooperate so as to effectively confine and retain the retainer rings, and hence the bearings, in proper relationship within the hub opening, while at the same time permitting the retainer rings to freely rotate relative to the end caps.

The end cap 41 is also preferably molded as an integral one-piece unit from a plastic material.

In the wheel assembly 10, the number of roller units provided in the bearing is preferably selected as an odd number, such as three, five or seven, with the number of roller units being maintained at a minimum consistent with the expected load requirements of the wheel assembly.

The wheel assembly is particularly desirable for use in situations where the wheel must possess substantial durability coupled with minimal rolling or rotational friction, and particularly in those situations wherein contamination of the bearing has been a continuing problem. For example, the improved wheel assembly is believed particularly desirable for use as a wheel on a shopping cart, or for use as a conveyor roller associated with a gravity-type or free-wheeling conveyor. Under such use situations, the support shaft 13 is normally supported so as to be nonrotatable, whereby the wheel assembly 10 thus freely rotates thereabouts. In such usage, the rollers 32 are preferably disposed in direct rolling engagement with the outer periphery of the shaft 13, which shaft thus effectively defines the inner bearing race. The rollers thus rotate about the shaft 13, and hence cause the retainers 34 to also rotate about the shaft. The rotatable engagement between the rollers 32 and the rim 11 enables the latter to freely rotatably move relative to the rollers. Since the rollers 32 themselves are rotatably supported on the axles 33, which axles 33 in turn are rotatably supported on the retainers 34, which retainers themselves are freely rotatable relative to both the shaft 13 and the rim 11, the wheel thus possesses a large number of degrees of relative rotational freedom between the various components, whereby relative rotation within the wheel assembly will thus occur at locations possessing minimum friction, which locations may vary from time to time depending upon the environmental conditions under which the wheel assembly is utilized.

Figure 2:
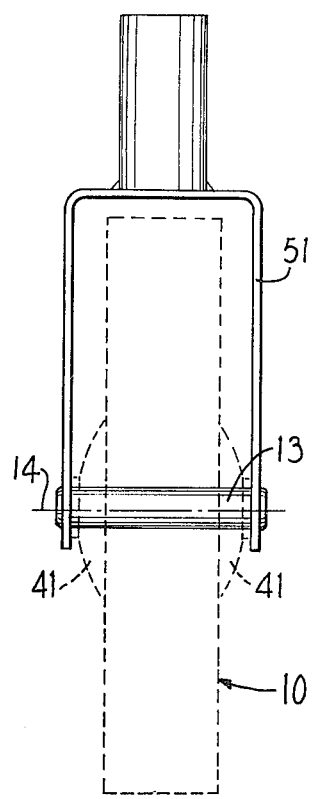
FIG. 2 is an end elevational view of FIG. 1, the wheel assembly being shown by dotted lines.
Figure 3:
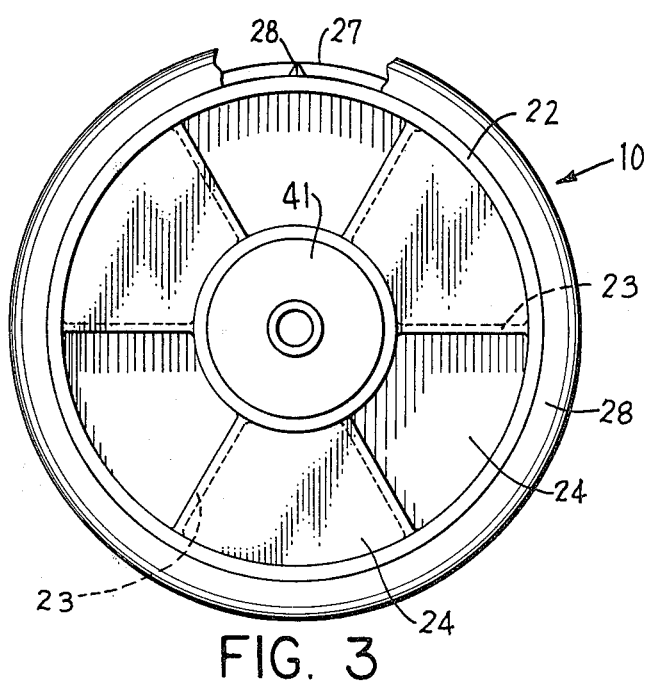
FIG. 3 is a fragmentary, side elevational view of the improved wheel assembly.

FIGS. 1 and 2 illustrate a typical mounting for the wheel assembly 10 when the wheel is used as a support roller for a shopping cart or the like. Under such usage, the wheel is supported within a substantially U-shaped yoke 51, which yoke supports thereon the support shaft 13. This yoke may be provided with any conventional mounting arrangement thereon, such as a stub shaft, to facilitate its securement to a cart or related device.

A significant advantage of the wheel assembly 10 as illustrated by FIG. 4, is the ability to fully assemble this wheel assembly prior to its being mounted on the support shaft 13. Since the end caps 41 function to hold the retainers, and hence the bearing rollers, within the central opening of the rim, the complete wheel assembly remains fully assembled and can be shipped in this fully assembled condition without requiring the presence of the central support shaft 13.

Referring now to FIGS. 6–10, there is illustrated a variation of the improved wheel assembly 10' according to the present invention. In this variation, the rim 11' is supported on the shaft 13' through the intermediate bearing means 12'. The rim 11' is formed as a one-piece annular hub having a tread 28' bonded therearound. The rim 11' has a large opening extending centrally therethrough, which opening is defined by the inner surface 18' which functions as an outer bearing race. This inner surface has a radially inwardly projecting rib or flange 19' positioned centrally thereof.

The bearing is formed by a plurality of angularly spaced rollers 32', there being five such rollers in the illustrated embodiment. Each roller 32' is formed substantially as a hollow sleeve provided with a surrounding annular groove formed centrally thereof, which annular groove accommodates therein the rib 19'. This annular groove, which is formed by an inwardly directed enlargement 32a associated with the roller, defines on the inner periphery thereof an annular surface 32b for rotatably engaging and supporting the axle 33'. This axle 33' includes a substantially central shaft portion which defines the rotational axis of the roller 32' and has a plurality of blades or vanes 33a fixed thereto and projecting radially thereof. These vanes 33a, which define a cross-shaped configuration, have the outer free ends thereof disposed in rotatable sliding engagement with the inner surface 32b of the roller 32'.

The opposite free ends of the axle 33' are accommodated in openings 38' formed in annular ring-shaped retainers 34', which arrangement enables each axle 33' to be rotatably supported relative to the retainers. The retainers themselves are located at opposite ends of the bearing rollers so as to confine same therebetween. These retainers 34' have central openings 36' so that the retainers snugly surround but are rotatable relative to the support shaft 13'. The innermost retainer abuts against a shoulder or flange 13a formed on the shaft, and the other retainer is suitably retained on the shaft by an annular flange 40 which forms part of a cup-shaped plug 40a, the latter being snapped into the free end of the shaft 13'.

The wheel assembly 10' has a pair of cuplike end caps 41' associated therewith for enclosing the opposite axial ends of the bearing arrangement. Each of these end caps 41' has a peripheral flange 44' which is snugly accommodated within an annular groove 45 formed in the side or end face of the rim. One of the end caps also has an appropriate central opening whereby the end cap snaps into an annular groove formed in the shaft 13', whereas the other end cap is solid and totally overlies the free end of the shaft.

In this variation, the shaft 13' is of a cantilevered construction in that one end of the shaft is suitably secured to a support horn 51', the latter including a side portion 54 which terminates in a top portion 56 which projects over the top of the tread. This top portion 56 in turn has a suitable stub axle 57 fixed thereto and projecting upwardly therefrom so that the longitudinal axis of this stub shaft is disposed substantially within the central transverse plane of the wheel assembly. This stub shaft 57, in the illustrated embodiment, is of a substantially cross-shaped cross section, and the free ends of the blades defining this stub shaft are suitably rounded so as to enable retainer sleeves 58 to be suitably slidably and rotatably supported thereon. A pair of opposed retainer sleeves 58 are suitably provided so as to enable the overall wheel assembly to be suitably mounted or attached to a desired structure.

In this variation, the support shaft 13' and horn 51' are preferably molded as an integral one-piece unit, such as from a hard low-friction plastic material. The axles 33', rollers 32' and rim 11' are also preferably molded in one piece of a hard low-friction plastic material. All of these components are preferably molded from Delrin, or a material having equivalent properties.

The wheel assemblies of this invention, namely the wheel assemblies 10 and 10' as described above, have exhibited extremely desirable operational properties in that the present invention thus provides a freely rotatable wheel which utilizes the planetary principle, and which permits substantially free and effortless rolling of the wheel relative to a substantially nonrotatable support axle. The free rolling of the wheel, which occurs due to the minimal friction which exists between the wheel rim and the support axle, thus permits rotation of the wheel while requiring less energy to effect such rotation. In addition, the arrangement of this invention, and the substantially unlimited degrees of rotational freedom, also allow the outer rim to traverse around the support axle through a greater distance than is achievable with wheels of standard construction. At the same time, this improved wheel can be very efficiently sealed so as to prevent contamination and wear of same, particularly the bearing components thereof, such as when such wheels are used in contaminating environments such as water, snow, ice or other environmental contaminating conditions.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A freely rotatable wheel assembly, comprising:
    a one-piece freely-rotatable annular rim having a central opening extending therethrough in coaxial alignment with the rotational axis of said rim, said rim being constructed of a hard low-friction material and having an inner annular surface which surrounds said opening for defining an outer bearing race;
    bearing means positioned within said central opening for creating a low-friction rolling engagement between said rim and a shaft which is coaxially and centrally positionable within said opening, said bearing means including a plurality of cylindrical rollers which are constructed of hard low-friction nonmetallic material, said rollers being positioned within said central opening and being uniformly angularly spaced apart around said rotational axis so that the axes of said rollers define a circular locus which is generated about said rotational axis, said rollers being individually disposed in direct rolling engagement with said outer bearing race and with an inner annular bearing race defined on the exterior periphery of the shaft;
    a pair of coaxially aligned but axially spaced annular retainers disposed concentrically with said central opening adjacent the opposite ends thereof so that said plurality of cylindrical rollers are disposed axially between said retainers, said retainers being freely rotatable relative to both said rim and said shaft; and
    an axle associated with each said roller for supporting same on and between said retainers, each said axle extending parallel to said rotational axis and having the opposite ends thereof freely rotatably supported on said retainers, each said axle also having a respective said roller freely rotatably supported thereon.

2. A wheel according to claim 1, including a pair of end caps associated with the opposite ends of said central opening for sealingly closing same, each of said end caps having an annular flange adjacent the periphery thereof which is fixedly and sealingly engaged with said annular rim, and at least one of said end caps having a shaft-receiving opening extending centrally therethrough in coaxial alignment with said central opening for permitting said shaft to project therethrough.

3. A wheel according to claim 1 or claim 2, wherein said rollers and said rim have cooperating side surface means which are disposed in relative sliding engagement with one another for absorbing axially-directed thrust forces.

4. A wheel according to claim 1 or claim 2, wherein each said roller includes two axially adjacent roller portions which have identical cylindrical annular engagement surfaces which are axially spaced apart by an intermediate annular groove, said outer bearing race as defined on said rim including two annular bearing tracks which are disposed in engagement with said roller portions and which are axially spaced apart by an annular projection which projects radially inwardly into said annular groove, said annular projection having the opposite side surfaces thereof disposed in slidable bearing engagement with opposed side surfaces on the roller portions for absorbing axially-directed thrust forces.

5. A wheel according to claim 2, wherein each said annular retainer has a concentric annular flange which is integral therewith and projects axially outwardly from the outer end thereof toward the adjacent end cap, said annular flange being of narrow radial width and terminating in a narrow annular end surface which is disposed opposite a flat bearing surface formed on the inner side of the adjacent end cap.

6. A wheel according to claim 1 or claim 5, wherein each said annular retainer has a plurality of enlargements thereon and angularly spaced therearound, each said enlargement having a blind bore formed therein for freely rotatably receiving one end of a respective said axle.

7. A wheel according to claim 1 or claim 5, wherein the rim includes inner and outer annular hubs which are concentrically related and are integrally rigidly joined together by radially extending ribs or webs, said inner hub having said outer bearing race formed concentrically on the inner peripheral surface thereof, said inner hub also having a radially inwardly projecting annular lip integrally associated therewith adjacent each end of said central opening, and the annular peripheral flange associated with each said end cap having means associated therewith for creating a resilient snap fit with said annular lip.

8. A wheel according to claim 1, wherein said rim has an annular projection extending radially outwardly therefrom and externally surrounding same, said rim also including a plurality of projections extending outwardly therefrom in circumferentially spaced relationship and being elongated in the axial direction of said rim, whereby said annular tread is molded in externally surrounding relationship to said rim so as to be molded around said projections.

9. A wheel according to claim 1 or claim 2, wherein said rim, said rollers and said retainers are all constructed of a hard low-friction plastic material.

10. A wheel according to claim 2, including axially opposed annular surfaces formed on the adjacent and opposed retainers and end caps for axially confining the retainers and the rollers mounted thereon between said end caps, whereby said wheel will remain completely assembled prior to mounting of same on the shaft.

11. A wheel according to claim 1, wherein the cylindrical roller comprises a thin sleevelike shell having a wall thickness which is small in relationship to its radius, and said axle comprising a central shaftlike portion having the opposite ends thereof rotatably supported in said retainers and a plurality of thin webs fixed to said shaftlike portion and projecting radially therefrom, said webs having narrow radially outer end surfaces disposed in rotatable sliding engagement with the inner periphery of the shell.

12. A wheel according to claim 1, wherein the shaft is coaxially supported within said rim and has an annular outer bearing race thereon disposed in rolling engagement with said rollers, said shaft being free of support at one end thereof and being fixedly supported at the other end thereof by an L-shaped horn which includes a first leg portion disposed adjacent one axial side of the roller and a second leg portion which is fixed to and projects axially from the outer end of the first leg portion so as to be positioned adjacent and overlap the annular tread, said second leg portion having a support axle fixed thereto and projecting outwardly therefrom such that the longitudinal axis of said support axle is perpendicular to said rotational axis and lies substantially within the central transverse plane of said wheel.

13. A wheel according to claim 12, wherein said shaft, said L-shaped horn and said support axle are all integrally molded in one piece of a hard and strong plastic material having a low-friction characteristic.

14. A wheel according to claim 12 or claim 13, wherein the support axle includes a central longitudinally extending axle portion and a plurality of axially elongated thin webs fixed thereto and projecting radially therefrom, and a sleeve structure positioned in surrounding relationship to said support axle and being rotatably slidably engaged with the radially outer ends of said webs.

15. A wheel according to claim 1 or claim 2, wherein said shaft is nonrotatable, whereby the wheel assembly freely rotates therearound.

* * * * *